(12) United States Patent
Bashir

(10) Patent No.: US 9,475,217 B2
(45) Date of Patent: Oct. 25, 2016

(54) PROCESS FOR MAKING HIGHLY CRYSTALLINE SHAPED PART FROM PET OR PEN

(71) Applicant: SAUDI BASIC INDUSTRIES CORPORATION, Riyadh (SA)

(72) Inventor: Zahir Bashir, Riyadh (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 65 days.

(21) Appl. No.: 14/166,313

(22) Filed: Jan. 28, 2014

(65) Prior Publication Data

US 2014/0213753 A1 Jul. 31, 2014

Related U.S. Application Data

(60) Provisional application No. 61/927,050, filed on Jan. 14, 2014.

(30) Foreign Application Priority Data

Jan. 31, 2013 (EP) ..................... 13000493

(51) Int. Cl.
| | |
|---|---|
| B29C 43/00 | (2006.01) |
| C08J 5/00 | (2006.01) |
| C08G 63/00 | (2006.01) |
| B29K 67/00 | (2006.01) |

(52) U.S. Cl.
CPC ........... *B29C 43/003* (2013.01); *B29C 43/006* (2013.01); *B29K 2067/00* (2013.01); *B29K 2995/0041* (2013.01)

(58) Field of Classification Search
CPC .............. B29C 43/003; B29C 43/006; B29K 2067/00; B29K 2995/0041
USPC ....................................................... 528/308.1
See application file for complete search history.

(56) References Cited

U.S. PATENT DOCUMENTS

| | | | |
|---|---|---|---|
| 3,846,522 A | 11/1974 | Goldman | |
| 4,014,965 A | 3/1977 | Stube et al. | |
| 4,272,475 A | 6/1981 | Chi | |
| 4,451,606 A | 5/1984 | Campbell | |
| 5,102,974 A | 4/1992 | Fialla | |
| 5,344,912 A | 9/1994 | Dalgewicz, III et al. | |
| 5,728,474 A * | 3/1998 | Niemeyer ............... | B29C 33/56 264/328.1 |
| 5,886,088 A | 3/1999 | Matsumoto et al. | |
| 6,677,415 B1 | 1/2004 | O'Connor et al. | |
| 2010/0164143 A1 | 7/2010 | Li et al. | |

FOREIGN PATENT DOCUMENTS

| | | |
|---|---|---|
| DE | 19637904 A1 | 3/1998 |
| KR | 20080043143 A | 5/2008 |
| KR | 102008004314 * | 5/2008 |

OTHER PUBLICATIONS

SKY PET BL 8050 Data ( 2008 as cited in KR 1020080043143).*
Modern Polyesters 2003 Abstract.*
Modern Polyesters 2003 pp. 166-167.*
Z. Bashir et al., "Evaluation of Three Methods for the Measurement of Crystallinity of PET Resins, Preforms, and Bottles" Polymer Engineering and Science, Nov. 2000, vol. 40, No. 11; 14 pages.
F. J. Balta Calleja et al., "Microhardness and structure of high pressure crystallized poly (ethylene terephthalate)" 1994; 5 pages.
R. De P. Daubeny et al., "The Crystal Structure of Polyethylene Terephthalate" Imperial Chemical Industries Limited, Plastics Division, Welwyn Garden City; 1954; 12 pages.
C. Santa Cruz et al., "Relating Microhardness of Poly(ethylene Terephthalate) to Microstructure" Journal of Polymer Science: Part B: Polymer Physics, vol. 29, 819-824 (1991); 6 pages.
B.B. Sauer et al., "Temperature modulated DSC studies of melting and recrystallization in polymers exhibiting multiple endotherms" Polymer 41 (2000) 1099-1108; 10 pages.
Korean Patent No. 20080043143; Publication Date: May 16, 2008; Abstract Only, 1 page.
Extended European Search Report; Application No. 13000493.0; Date of Mailing: Jul. 18, 2013; 5 pages.
International Publication No. 9812035; Publication Date: Mar. 26, 1998; Abstract Only, 2 pages.

* cited by examiner

Primary Examiner — Ling Choi
Assistant Examiner — Gennadiy Mesh
(74) Attorney, Agent, or Firm — Cantor Colburn LLP

(57) ABSTRACT

A process for making a shaped part from a polymer selected from polyethylene terephthalate (PET) and polyethylene terephthalate (PET) and polyethylene naphthalate (PEN) by using a compacting tool comprising a die having a cavity and a punch having an outer surface. The process comprises the steps of: a) placing particles of the polymer in the cavity of the die heated to a compaction temperature, wherein the polymer has an intrinsic viscosity of at least 0.45 dL/g wherein the particles are a mixture of first particles with a particle size of 0.5-4000 μm and second particles with a particle size of 1000-4000 μm b) pressing the particles in the die cavity at a pressure of at least 3 MPa for 5-15 minutes while maintaining the temperature of the die at the compaction temperature and c) removing the shaped part from the die cavity. When the polymer is PET, the compaction temperature is 235-259° C. When the polymer is PEN, the compaction temperature is 250-275 ° C.

13 Claims, 5 Drawing Sheets

PROCESS FOR MAKING HIGHLY CRYSTALLINE SHAPED PART FROM PET OR PEN

The present application claims the benefit of Provisional Application Ser. No. 61/927,050 filed Jan. 14, 2014, the contents of which are incorporated herein in their entirety by reference and also claims priority to European Application No. 13000493.0, filed Jan. 31, 2013, the contents of which are also incorporated herein in their entirety by reference.

The present invention relates to a process for making a highly crystalline shaped part from a polymer selected from polyethylene terephthalate (PET) and polyethylene naphthalate (PEN). The present invention also relates to a highly crystalline shaped part obtainable thereby.

Semi-aromatic polyesters derived from terephthalic acid and aliphatic diols like ethylene glycol, 1, 3 propane diol, 1,4 butane diol are commercially produced because of their useful properties. Of these, PET, produced from terephthalic acid and ethylene glycol, is the most widely produced on an industrial scale, due to an excellent balance of properties. PET is used for making oriented fibres for textiles, for BOPET films, and for bottles. Where PET has not succeeded is as an injection moulding resin. The reason is that this polymer has low crystallisaton kinetics. That is, it is a crystallisable polymer, but it crystallises too slowly during injection moulding. Polybutylene terephthalate (PBT), which crystallises faster, has become the standard polyester for injection moulding, despite it being more costly than PET.

The slow crystallisation rate of PET has in fact been used with advantage in many applications. PET can be quench-cooled to form transparent amorphous film or sheet for instance. The amorphous film can then be biaxially stretched to obtain dimensionally stable, semi-crystalline but transparent film with enhanced mechanical properties. Transparent amorphous sheets can be thermoformed to yield transparent packages. Likewise, for making transparent semi-crystalline bottles, an amorphous preform is injection moulded first. In all these cases, the amorphous PET product made by quench cooling from the molten state is merely an intermediate for making an oriented semi-crystalline article. Orientation increases the crystallisation rate.

The amorphous state in PET is not thermodynamically stable. Heating amorphous PET (chips, sheet, preform) above the $T_g$ would cause softening and then spherulitic crystallisation would occur, and this results in haze. Thus, through injection moulding, it would be possible to fabricate an amorphous PET article by quench cooling inside the mould, but the article would not be stable above the $T_g$ and hence amorphous PET articles can usually only be used as an intermediate. If a thick part is injection moulded from PET, even with quench cooling, it would typically show a skin-core morphology. The outer skin adjacent to the chilled mould would be amorphous, while the core which has cooled more slowly would be somewhat crystallised. This can be seen quite clearly as the cross-section would appear transparent on the skin (amorphous) while the core would appear milky (due to spheurlitic crystallisation). Such parts thus have inhomogenous properties, and they warp.

PEN is another slowly-crystallising polyester. It is derived from naphthalene dicarboxylic acid and ethylene glycol. The statements made about PET apply to PEN as well. On the other hand, polybutylene terephthalate is a polyester that crystallises fast, owing to the flexible C4 aliphatic component. Hence, PBT has become the preferred polyester for injection moulding, despite its inferior $T_g$ and $T_m$, (45° C. and 220° C. respectively) compared with PET.

Cruz et al. have shown that highly crystalline PET (which should be obtained) has some excellent properties. Apart from the high $T_g$ and $T_m$, it was shown that highly crystalline PET has a high hardness and scratch resistance. The microhardness of amorphous PET is about 120 MPa. For spherulitically crystallised PET at 117° C., the hardness increases to 200 MPa; [see "Relating Microhardness of Poly(Ethylene Terephthalate) to Microstructure", C. Santa Cruz, F. J. Balta Calleja, H. G. Zachmann, N. Stribeck and T. Asano, Journal of Polymer Science (Physics), 29, 819-824 (1991)]. In their experiment, amorphous PET film was made and then crystallised by annealing at 117° C. This led to a rise in hardness from about 100 MPa to 200 MPa in about 5 minutes; after this, the hardness reached a plateau with time. The rise in hardness was due to crystallisation; the corresponding crystallinity where the plateau in the hardness was reached was 25%. Further increase in crystallinity and hardness could only be achieved by annealing at temperatures (170° C.-250° C.), but now in a time scale of hours. Annealing times of 24 hours achieved a crystallinity of ~45%. The increase in hardness to 250 MPa was due to two factors: there is further increase in crystallinity from 25% to 45%, but there is also lamellar thickening.

The method of Cruz at al. is proof of principle that the hardness of PET can be more than doubled through crystallisation. However, the method shown (annealing an amorphous PET for 24 hours) is clearly impractical for making a high crystallinity article from PET. It is evident that high crystallinity has benefits and it would be worth finding an alternative way to make highly crystallised PET articles.

Conventional methods have been adopted in the prior art to make PET suitable for making crystallised articles by injection moulding. These are (1) by using nucleating agents to increase crystallisation rate (2) by using heated moulds and (3) by using plasticiser.

As a high mould temperature is required for PET melt to crystallise, an oil bath system is necessary for moulding PET articles with uniform crystallinity across the thickness. Compared with the water bath system used for polybutylene terephthalate (PBT), the oil bath system for PET is more costly and dangerous.

In U.S. Pat. No. 4,272,475, Chi discloses a method for controlling the cylinder temperature, the nozzle temperature, the injection temperature, and the shot time for PET injection articles, but the molecular weight of the articles was too low to be used in engineering-grade plastics.

For increasing the crystallisation rate of PET, U.S. Pat. No. 4,451,606 discloses an organic nucleating agent, which is a copolymer of poly(alkylene terephthalate) and a sulphonate salt of an aromatic dicarboxylic acid. This organic nucleating agent can be miscible with PET and cause uniform nucleation. The organic nucleation agent, however, may lose its function at high temperature (about 280-300° C.) due to disproportion or degradation.

Inorganic nucleating agents to improve PET crystallisation rate have been adopted. As disclosed in U.S. Pat. No. 5,886,088, suitable inorganic nucleating agents include talc, mica, wollastonite, clay, kaolin, diatomaceous earth, bentonite, montmorillonite, hydrotalcite, calcium carbonate, titanium oxide, potassium titanate, asbestos, or barium oxide. The inorganic nucleating agents are less costly, chemically stable, applicable at high temperatures, and of small size to minimize grain radius. The inorganic nucleating agents may improve dimension stability and mechanical strength, but they tend to aggregate at high temperatures due to their large surface area and fewer coordination sites. The described aggregation results in non-uniform nucleation of polymer, thereby deteriorating the properties of PET.

United States Patent publication 20100164143 teaches a method to incorporate the nucleating agent into the chain. The nucleating agent comprises a $SiO_2$ core grafted with bis(2-hydroxyethyl)terephthalate, which accelerates the crystallisation of polyethylene terephthalate for injection moulding. Because the nucleating agent is grafted to the molecular chain at the beginning, the additives of the invention do not require other nucleating agents. The advantage is that lower mould temperatures can be used; the invention allowed the use of a water bath system instead of the conventional oil bath system for injection moulding PET. The lower cooling temperature means shorter cooling time and shorter injection moulding cycle time. However, in US Patent publication 20100164143, the crystallinity obtained in the moulded PET with the nucleating agent was only 8.5%, compared with 1.6% in PET moulded without the nucleating agent.

It is found that some nucleating agents for PET like sodium acetate work by causing some hydrolysis. This means there is a drop in molecular weight; lower molecular weight crystallises faster but this is undesirable as it weakens the polymer. To solve this, a chain extender is added with the nucleating agent The use of hot moulds requires hot oil and moreover the cycle times are still too long, compared with that needed for making parts of the same thickness from PBT. Plasticiser increases the mobility of the chains and increases crystallisation rate, but it brings with it other problems; plasticiser depresses the $T_g$ and further it can leach and dry out with time.

Glass-fibre filled injection moulding grades of PET are known with high stiffness and Vicat softening points near 220° C. However, glass fibres are abrasive and recycling of mouldings made with it is problematic.

Thus, injection moulding methods which generally involve melting the polymer into a transparent fluid and injecting it into a colder mould have not led to the production of dimensionally stable, highly crystalline PET articles with high $T_g$, high $T_m$ and high hardness, without the use of glass fibres.

There is a demand for an alternative method to obtain highly crystalline mouldings from slowly crystallising polymers such as PET and PEN that can be made by an industrially feasible process using readily available tooling.

The other prior art that could be adopted is from the field of powder metallurgy. In powder metallurgy, powdered metal is compacted at room temperature in a punch-and-die type tool to form a 'green compact'. The article compacted at room temperature has substantial porosity and hence it is quite brittle. To improve the mechanical properties, the green compact is sintered just below the melting temperature. This causes densification, and joining together of the powder particles, and the strengths can approach 97-99% of the strengths of an equivalent monolithic part, made by machining the metal. This method of production is now industrial and is used to make for example metal gears for automotive. The gears made by metal powder compaction can attain over 97% of the density of a machined part. The economy of scale and mass production is attained by making a plurality of green compacts and then sintering them together in an oven.

The exact procedure used in powder metallurgy was tried with the PET powder by the inventors of the present invention as described in the Comparative Examples 2 and 3, but it was not successful. As in powder metallurgy, a green compact was made at room temperature and it was subjected to free sintering (pressure-less sintering) just below the melting point. However, this approach did not work with PET. A cylindrical green compact could indeed be made by pressing the crystalline PET powder cold in a punch-and-die tool, but it could not be densified by pressureless sintering, as it melted partially and flowed. Without being bound by any theory, the reason metals can be subjected to pressureless sintering just below their melting point after making a green compact is thought to be because they have a narrow melting point of 2-3° C., whereas with polymers, the melting point is broad (over 20° C.-30° C.), hence if a cold compact of a low melt viscosity polymer such as PET is sintered 15° C. below the melting endpoint, a part of it will melt and flow. FIG. 1 shows the melting curve for high crystallinity PET powder; it can be seen the melting onset is 210° C., with peak at 240° C., and endpoint at 270° C.). Hence, if a green compact made from this PET powder is kept in an oven at say 245° C. to consolidate it, the material will instead melt and flow like candle wax.

Variations of the powder metallurgy method have been successfully used for two polymers, polytetrafluoroethylene (PTFE), and ultrahigh molecular weight polyethylene. Both these polymers have over 80% crystallinity, and have ultra high melt viscosity, so they cannot be injection moulded or extruded. In the case of PTFE, shaped articles are formed by cold compaction of the powder and it is followed by pressureless sintering in an oven at temperatures above the melting point of the polymer. The article maintains shape even above the melting point because the viscosity is so high that it inhibits flow due to gravity, and on cooling, the PTFE recrystallises rapidly.

The same method is used for ultrahigh molecular weight polyethylene ($M_w$ average$>1\times10^6$). For example, U.S. Pat. No. 6,677,415 describes a process for compression moulding an article from a polymer powder comprising: a) applying a polymer powder to a mould; b) compacting the polymer powder by the application of a pressure P; c) raising the temperature of the surface of the mould to a value above the melting temperature of the polymer powder; and d) maintaining a temperature $T_M$ at the surface of the mould for a period of time $t_M$ and then cooling to a temperature below the crystallisation temperature of the polymer. The polymer referred to in U.S. Pat. No. 6,677,415 is ultrahigh molecular weight polyethylene. The compacted ultrahigh molecular weight polyethylene when taken above the melting point appears as a slightly hazy melt, because of the grain boundaries. The sintering has to be done above the melting point, for a sufficient time, so that the powder grain boundaries disappear. Again, like PTFE, the compacted ultrahigh molecular weight polyethylene can be taken above the melting point and subjected to 'free sintering' only because the melt viscosity is so high that it will not flow and lose shape. On cooling, the polymer crystallises back quickly.

The method used for metals, PTFE, and ultrahigh molecular weight polyethylene, did not work with PET. With metal powders, the green compact is made by cold pressing; the free sintering is done just below the melting point and this is possible because there is no low melting onset-tail with metals (in fact if such a broad melting range with a low tail existed in metals, free sintering would not be possible as molten metals have even lower melt viscosity than water and so would flow and lose shape). In the case of PTFE and ultrahigh molecular weight polyethylene, the powder compaction is done cold, but the sintering has to be done above the melting point because the chains have to diffuse across the grain boundary; the process works with these two polymers above the melting point only because the melt viscosity is extremely high and the compacts do not lose shape in the molten state.

Further, unlike semi-aromatic polyesters like PET and PEN, there is no issue of loss of crystallinity by crossing the melting point in PTFE and ultrahigh molecular weight polyethylene, as they re-crystallise rapidly on cooling.

With PET, making a cold compact and sintering above the melting point (as is the practice with PTFE and ultra high molecular weight) would not be feasible because PET's melt viscosity is low (500-800 Pa·s) compared with PTFE and on crossing the melting endpoint (260° C.), the material will flow and lose shape quickly; further, regaining crystallinity after melting is difficult in PET. As noted, pressureless sintering even in the range 230-260° C. also did not work for PET powder.

Korean patent publication KR20080043143 describes a method to form thermostable PET parts by compression moulding powder made by pulverising crystalline PET chips. The pulverised PET powder was made by cryogenically grinding highly crystalline PET chips to a particle size of <0.5 mm, and 0.2 mm (200 microns) in the examples. The powder was placed in a mould and compression moulded into a spoon in the interval 220-260° C., at a pressure 4-20 kg/cm$^2$ (0.4 to 2 MPa) for 5-30 minutes. KR20080043143 states that the moulded object, the spoon, is thermostable, that is, it has a heat resistance up to 180° C. By this, it was meant that when the spoons were placed in an oven up to 180° C. for 5 hours, they did not soften and lose their shape. It was stated that if the pressure was below 4 kg/cm$^2$ (0.4 MPa), then the sintering was not sufficient in the object; equally, if the pressure exceeded 20 kg/cm$^2$ (2 MPa), it was stated that the heat resistance level of the object was reduced. As a comparison, it was stated if a 1 mm amorphous sheet of PET was extruded and thermoformed into spoons, these would distort if heated to 70° C.

No indication was given on the mechanical properties in the Korean patent. Further, if the process is practised as described with thick samples (for example 6 mm thick; instead of <1 mm thick as would be expected of a spoon), air entrapped in the powder can lead to voids in the core of the moulding, which reduces the tensile strength and the impact strength. The limitation on the pressures range to low values 0.4-2 MPa would also leave a higher void content. Since no mechanical properties were given in KR20080043143, the effect of voids in a brittle material is not apparent. In fact, such a method of preparation of a PET moulding would be worse than using injection moulding. Although the spoon might have been thermostable up to 180° C., it would be of little practical value if the moulding is voided and brittle. This is a hurdle especially when making thicker mouldings than a thin spoon.

It is an objective of the present invention to provide a method to obtain shaped parts from slowly crystallising polymers such as PET and PEN in which the above and/or other problems are overcome.

The present invention provides a process for making a shaped part from a polymer selected from PET and PEN by using a compacting tool comprising a die having a cavity and a punch having an outer surface corresponding to the cavity, wherein the process comprises the steps of:

a) placing particles of the polymer in the cavity of the die heated to a compaction temperature, wherein the polymer has an intrinsic viscosity of at least 0.45 dL/g and the particles have an average particle size of 0.5-4000 µm, b) pressing the particles in the die cavity at a pressure of at least 3 MPa for 5-15 minutes while maintaining the temperature of the die at the compaction temperature to form the shaped part and c) removing the shaped part from the die cavity, wherein when the polymer is PET, the compaction temperature is 235-259° C. and wherein when the polymer is PEN, the compaction temperature is 250-275° C.

In order to obtain shaped parts with the highest crystallinity, it is most preferred to use homopolymers of PET and PEN.

PET is generally known to be made by polycondensation of terephthalic acid and ethylene glycol. During the esterification process, a small amount of ethylene glycol reacts to form diethylene glycol (DEG), and since this has two terminal hydroxyl groups, the DEG acts as an inadvertent comonomer and gets incorporated in the chain. Hence, a PET homopolymer may contain a small amount of DEG, e.g. 0.8 to 1.5 wt % of DEG. As used herein, the term "PET homopolymer" may contain up to 1.5 wt % of DEG. Similarly, the term "PEN homopolymer" may contain up to 1.5 wt % of DEG.

Although the homopolymer is most preferred, it is possible to use a copolymer with a comonomer (other than DEG) but at levels below 10 wt %, and preferably below 5 wt %. As used herein, PET is understood to mean both a PET homopolymer and a PET copolymer comprising at most 10 wt % of a comonomer as listed below. Similarly, PEN is understood to mean both a PEN homopolymer and a PEN copolymer comprising at most 10 wt % of a comonomer as listed below.

The most common comonomers for PET or PEN are isophthalic acid and/or 1,4-cyclohexane dimethanol.

Other dicarboxylic acid compounds that could be comonomers include oxalic acid, malonic acid, succinic acid, glutaric acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 1,3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid, and dimeric acid; unsaturated aliphatic dicarboxylic acids such as fumaric acid, maleic acid, and itaconic acid; and aromatic dicarboxylic acid such as orthophthalic acid, isophthalic acid, terephthalic acid, 5-(alkali metal)sulphoisophthalic acid, diphenic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 4,4,-biphenyldicarboxylic acid, 4,4'-biphenylsulphonedicarboxylic acid, 4,4'-biphenyl ether dicarboxylic acid, 1,2-bis(phenoxy)ethane-p, p'-dicarboxylic acid, pamoic acid, and anthracene dicarboxylic acid. Other dicarboxylic acids, and minor amounts of polycarboxylic acids or hydroxycarboxylic acids may also be used as constituent components.

Diols can also be comonomers. Examples include 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, cis 1,4-cyclohexanedimethanol, trans 1,4-cyclohexanediethanol, 1,10-decamethylene glycol, 1,12-dodecanediol, polyethylene glycol, polytrimethylene glycol, and polytetramethylene glycol; and aromatic glycols such as hydroquinone, 4,4'- dihydroxybisphenol, 1,4-bis(β-hydroxyethoxy)benzene, 1,4-bis(β-hydroxyethoxyphenyl)sulfone, bis(p-hydroxyphenyl)ether, bis(p-hydroxyphenyl)sulfone, bis(p-hydroxyphenyl)methane, 1,2-bis(p-hydroxyphenyl)ethane, bisphenol A, bisphenol C, 2,5-naphthalenediol, and glycols obtained by adding ethylene oxide to these glycols.

Polyhydric alchohols in very small amounts could be comonomers. Examples include trimethylolmethane, trimethylolethane, trimethylolpropane, pentaerythritol, glycerol, and hexanetriol.

Hydroxycarboxylic acids could also be present as comonomers. Examples of hydroxycarboxylic acids may include lactic acid, citric acid, malic acid, tartaric acid, hydroxyacetic acid, 3-hydroxybutyric acid, p-hydroxybenzoic acid, p-(2-hydroxyethoxy)benzoic acid, 4-hydroxycyclohexanecarboxylic acid and their ester-forming derivatives.

Also, blends of various polyesters, such as copolymers of ethylene terephthalate or ethylene naphthalate with different comonomers having different intrinsic viscosities may also be used.

For instance, a blend comprising about 50 wt % PET homopolymer and about 50 wt % copolymer of PET containing 2 wt % isophthalic acid comonomer may also be applied.

Recycled PET powder or pellets, or blends with recycled PET e.g. virgin PET with a recycled PET, may also be used. The recycled PET having an I.V. of at least 0.45 dL/g may be generally derived from recycled PET bottle flakes, and may contain for example isophthalic acid or 1,4-cyclohexane dimethanol comonomer in various amounts, such as from 0.3 wt % to 3 wt %.

Most preferably, the raw material is a PET or PEN homopolymer powder with the minimum amount of DEG, as this gives the highest crystallinity.

Compaction Temperature

The invention is based on the realization that the combination of a relatively high pressure and a compaction temperature slightly below the temperature at which the polymer completely melts (that is, when it becomes a transparent fluid), results in a shaped part with a high crystallinity and desired mechanical properties. The suitable range of the compaction temperature is between the temperature at which the polymer starts to soften and melt and the temperature at which the polymer completely melts (that is, when it becomes a transparent fluid). This temperature range was found to be 235-259° C. for PEN and 250-275° C. for PEN.

When the polymer is PET, the compaction temperature is 235-259° C., preferably at least 240° C., more preferably at least 245° C. The intrinsic viscosity of the PET is at least 0.45 dL/g, preferably at least 0.70 dL/g, more preferably at least 1.0 dL/g.

The surface finish is smoother when a higher temperature is used within this compaction temperature window. Accordingly, the compaction temperature is preferably 250-259° C. When the compaction temperature is below 255° C., the shaped part may be removed from the die cavity at the compaction temperature. When the compaction temperature is 255-259° C., surface damage is observed in the shaped part if it is removed from the die cavity at the compaction temperature. This problem is solved by removing the shaped part after the die cavity is cooled to a temperature below 255° C. Accordingly, in some embodiments, step c) is performed at a temperature lower than the compaction temperature, such as at least 1° C., 2° C., 3° C., 5° C. or 10° C. lower than the compaction temperature. Accordingly, in some embodiments, the polymer is PET, the compaction temperature is 255-259° C. and step c) is performed at a temperature below 255° C., preferably below 250° C.

It is noted that KR20080043143 does not indicate the temperature at which the spoon compacted from PET powder was ejected from the mould (that is, whether it was ejected at the compaction temperature or cooled and ejected) and the problem of the part sticking to the mould in the temperature interval 255-260° C. was therefore not realised.

When the polymer is PEN, the compaction temperature is 250-275° C., preferably at least 255° C., more preferably at least 260° C. The intrinsic viscosity of the polymer is at least 0.45 dL/g, preferably at least 0.70 dL/g, and preferably is at most 0.90 dL/g.

The preferred compaction temperature in for PEN in view of the surface finish is e.g. 265-275° C. Similar to the case with PET, step c) may be performed at a temperature lower than the compaction temperature, such as at least 1° C., 2° C., 3° C., 5° C. or 10° C. lower than the compaction temperature. Accordingly, in some embodiments, the polymer is PEN, the compaction temperature is 265-275° C. and step c) is performed at a temperature below 265° C., preferably below 260° C.

Cooling the part for ejection means that the tool may have to be heated and cooled repeatedly in a continuous production, and this will increase the cycle time if ordinary heating methods are used. To solve this, it is possible to adapt a rapid cooling and re-heating technology e.g. the Cage System® which is an injection moudling technology from RocTool SA, (France). This technology rapidly heats only the tool surface by induction. The mould is then cooled down rapidly with water cooling lines which are placed close to the tool surface. This system which is used with conventional injection moulding of polymer melts can be adapted for the tooling used in the present invention. Thus, powder compaction at a high temperature resulting in good surface finish, high crystallinity and low cycle time is achievable by using cooling and rapid induction heating of the tool surfaces.

Compaction Pressure and Particle Size

The particles are pressed in step b) by using the punch under a pressure of at least 3 MPa in the compacting tool at a raised temperature.

The high pressure of at least 3 MPa allows good consolidation and minimises voids. The effect of minimisation of the voids is especially visible for parts with higher aspect ratios. The pressure in step b) is preferably at least 3 MPa, more preferably at least 25 MPa, more preferably at least 40 MPa. The pressure in step b) may even be at least 75 MPa, at least 100 MPa, at least 150 MPa or at least 175 MPa.

It is noted that KR20080043143 restricts the compaction pressure to 0.4 MPa to 2 MPa and states that outside this range, the properties of the moulded object deteriorate.

Preferably, the average particle size of the particles is 0.5-200 μm. This results in a high crystallinity in the shaped part. A pressure up to about 50 MPa is sufficient for particles of this size range. It was also found that a wide temperature window can be used for this low particle size.

The particles may also be particles which are normally considered as pellets, i.e. particles with the average particle size of 1000-4000 μm (1-4 mm) or 3000-4000 μm (3-4 mm). Use of these large sized pellets are advantageous in some cases since they are commercially readily available. It is highly advantageous that the present invention allows the formation of the shaped part without grinding the pellets into powders. In this case, the pressure in step b) is preferably at least 50 MPa, more preferably at least 100 MPa, more preferably at least 150 MPa, even more preferably at least 175 MPa. The most preferred compaction temperature for these particles of PET may be between 245-250° C. Accordingly, in some embodiments, the polymer is PET, the particles have an average particle size of 1000-4000 µm, the pressure in step b) is at least 50 MPa and the compaction temperature is 245-250° C.

In some embodiments, the particles to be placed in the die cavity include two or more types of particles with different particle size distributions (for example, a bimodal particle distribution). In this case, the pressure in step b) is preferably chosen according to the particles having the largest average particle size. For example, the particles may be a mixture of first particles with an average particle size of 1-200 µm and second particles with an average particle size of 1000-4000 µm. In this case, the pressure in step b) is preferably at least 50 MPa, more preferably at least 100 MPa, even more preferably at least 150 MPa, even more preferably at least 175 MPa.

Shaped Part

The resulting shaped part from the process according to the present invention is stiff, strong and sufficiently tough, and resistant to thermomechanical deformation up to about 225° C., because it is highly crystalline. Such a part cannot be made from PET and PEN by an industrially operable prior-art process, such as injection moulding, the standard powder metallurgy method, pressureless sintering above the melting point as used for PTFE and UHMW PE, or the teaching of KR20080043143.

The properties of the high crystallinity PET part made according to the invention are outstanding and are comparable to glass-fibre reinforced injection moulded articles of PET. The density is greater than 1.360 g/cm$^3$. The tensile modulus is 3-4 GPa, the Vicat softening point is more than 200° C., the scratch and indentation resistance is high, the creep is low and so is the coefficient of friction.

Although not wishing to be bound by any theory, the inventors believe that the success of the powder compaction moulding depends on the fact that the surface of the powder particle has a lower melting point than its interior. In the compaction temperature range as defined, the surfaces of the powder particles melt and bond them together, while the core of each particle retains its high crystallinity. On cooling, the powder particles cement together as the fused surfaces crystallise quickly because the unmelted cores of the powder particles act as nucleating agents. Preferably, the powder particle boundaries have disappeared in the shaped part.

Equipment and Tooling

The compacting tool used in the present invention is of the type with a die having a cavity and a punch having an outer surface corresponding to the cavity. This type of tooling is typically used in powder metallurgy. Tooling for powder metallurgy is specialised but well established, and is of the die and punch type. The terms 'die' and 'punch' as used herein are understood as used in the field of powder metallurgy, i.e. the die has a cavity made to the shape of the part and which is filled with the material in powder form to be compressed, and the punch is the male counterpart for the cavity, which transmits the pressure. The die and punch tool set is similar to a socket and plug set. Note that in polymer fabrication, the term 'die' is used for a channel through which the polymer melt flows, and the term 'mould' is used for the cavity that confers the shape of the article.

It was surprisingly found that the use of this specific type of tools was essential for obtaining a highly crystalline shaped part as desired. It was found that this type of tools drives out the air between the particles and prevents pores from being formed in the obtained shaped part.

The equipment used in powder metallurgy may be used in the process of the present invention without modification or possibly with some modification. The possible main modification involves heating capability for the die. In preferred embodiments, a vacuum facility for removing air between the particles may be installed.

In powder metallurgy, simple cylindrical shapes can be made with a single sided die-and-punch tool. A fixed volume or weight of metal powder is placed in the die from a fill shoe and the punch applies the pressure. The die-and-punch tooling leads to a pressure gradient with the lowest pressure being felt by the diameter half way along the cylinder length (unlike a liquid, the pressure is not equal throughout in a solid medium). A double-sided punch-and-die can also be used to make cylindrical shapes in powder metallurgy. In this case, there are two pistons compressing the powder from the top and bottom of the die. Compaction pressure applied through punches from both ends of the toolset is preferred in order to reduce the pressure gradient and hence the level of density gradient within the compact. The compact can be ejected from the die, using the lower punch(es). The cycle can be readily automated and leads to a mass production process.

The dimensions of the shaped part that can be made according to the present invention are in principle not limited. It is however noted that powder metallurgy teaches us that the pressure gradients can lead to density gradients above an aspect ratio of about 2.4:1 or 3:1. For a cylinder the aspect ratio as defined here means thickness (or length) of cylinder: diameter of cylinder. The centre-line of the shaped part (that is cross section at the mid-length) experiences the least pressure during compaction and so would be a weak zone. The consolidation depends on several interacting factors: (1) particle size (2) temperature (3) pressure (4) recyrystallisaton tendency (5) aspect ratio. Knowing the above factors, the person skilled in the art can easily choose these parameters for making a satisfactory shaped part. Nevertheless, the shaped part obtained according to the invention preferably does not have a portion having an aspect ratio of above 2.4:1 or 3:1.

A cylindrical object requires the simplest tooling (piston and cavity). Complex parts such as gears may also be made using the tool sets used in powder metallurgy. It is possible to incorporate any complexity in the radial direction (i.e. in the plan view of the part); if the shape can be cut into the die, then it can be formed in the part. Changes in section thickness can be created by the use of multiple top and bottom punches and holes in this direction can be created through the use of core rods and mandrels in the toolset. For making a gear, the punch will be a cylindrical tool with the teeth of the gear cut along its circumference, and the die or cavity will have the teeth of the gear cut into the entire length of the barrel. A range of products such as gears, cams, cutting tools, porous metal filters, oil-impregnated bearings, and piston rings in engines are typical parts made by compaction of metal powder followed by pressureless sintering. In powder metallurgy, a green compact is made by cold compaction in the die and punch tool, then heated in an oven to 70%-90% of melting point to cause diffusion welding of the part. The part is further densified in a three-stage sintering furnace. For PET and PEN however cold compaction followed by pressureless diffusion welding and sintering does not work. Instead, the die and punch tool must be used to apply heat and pressure simultaneously, as is done in the process of the present invention In addition, secondary operations used in powder metallurgy such as coining (for example to emboss a logo), and oil impregnation of the compacted moulding for self-lubricated bearings can be adapted for the process according to the invention.

A capillary rheometer (used usually for rheological measurements for polymer melts) approximates a punch-and-die tool with heating, and is suitable for the process of the present invention.

Preferably, the compaction tool is of a type in which vacuum can be applied to the cavity of the die. Accordingly, the process preferably further comprises the step of applying vacuum to the cavity of the die between steps a) and b). This further prevents macro-voids due to trapped air.

Preferably, the cavity of the die and the corresponding outer surface of the punch have a brass surface. This makes the removal step c) to be performed easily. It was found that PET or PEN parts had a tendency to stick to steel and aluminium, and this made debonding from the mould difficult. For example, a silicone mould release spray is required for removing the shaped parts from a mould made of steel or aluminium. Using brass tools reduces the sticking tendency of the PET or PEN parts. However, there are other steels and metals that can be used, providing they have low sticking tendency to PET and PEN. This allows removal of the shaped part at the compaction temperature without damage to the surface, even when removal step c) is performed at a high temperature: 255-259° C. for PET and 265-275° C. Removing the shaped part at the compaction temperature is advantageous, as it frees the mould for refilling with powder immediately; whereas if it has to be cooled, there will be a delay in time, and also further time is needed to reheat the mould back to the compaction temperature.

The die and the punch may be made of brass. Alternatively, the die and the punch may be made of a different material coated with brass. Alternatively, the die and punch may be made of any metal that has low sticking tendency to PET and PEN.

Accordingly, the process may further comprise the step of refilling the die and making the shaped part continuously.

Preferably, step b) is performed in a dry nitrogen atmosphere. This reduces moisture level and also hydrolysis during moulding. More preferably, steps a)-c) are performed in a dry nitrogen atmosphere.

Preferably, the polymer powder to be set in the die in step a) is pre-heated. This would reduce the time for the process since the time for the powder to reach the compaction temperature in the tool can be reduced. Preferably, the polymer powder to be set in the die in step a) is pre-heated to a temperature 100-50° C. below the compaction temperature.

In particularly preferred embodiments, the polymer is PET and step c) is performed at a temperature of 230-255° C. and the particles to be set in the die in step a) is pre-heated to a temperature 100-50° C. below the compaction temperature. In other particularly preferred embodiments, the polymer is PEN and step c) is performed at a temperature of 250-265° and the particles to be set in the die in step a) is pre-heateding to a temperature 100-50° C. below the compaction temperature. The time required for the process is substantially reduced, and the process may be completed in less than five minutes.

The pre-heating treatment has a further advantage that the polymer is dried. Preferably, the polymer is dried to a moisture level of less than 50 ppm. This reduces hydrolysis and molecular weight drop during moulding. This may be achieved by pre-heating treatment at the temperature of e.g. about 100-50° C. below the compaction temperature for 1-5 h using vacuum or dehumidified air.

Raw Materials Used in the Present Invention

It was found that highly crystalline PET or PEN powder is the most preferred raw material due to its wide processing window. It was also found that even highly crystalline standard pellets of bottle grade PET or PEN can be compacted. Mixtures of powders and pellets may also be used.

The particles for use in the present invention have an average particle size of 0.5-4000 μm. The particle size distribution may be established with laser light scattering.

Preferably, the particles are highly crystalline, although amorphous particles can also be used. Preferably, the particles have a heat of fusion of at least 40 J/g (more preferably at least 45 J/g, at least 50 J/g or at least 55 J/g), as determined from the first heating curve of DSC at a heating rate of 10° C./minute. The first heating curve of DSC may show one or more melting peaks. The area under the melting peak(s) gives the heat of fusion for the sample. This heat of fusion gives an indication of the crystallinity. The particles preferably have a crystallinity of at least 30%, more preferably at least 35%, more preferably at least 45%, even more preferably at least 50%.

The heat of fusion gives an indication of the crystallinity of the PET particles according to the following equation:

$$\% \text{ crystallinity} = (\Delta H_{sample}/\Delta H_{PET\ single\ crystal}) \times 100 \quad \text{Equation 1-1}$$

wherein $\Delta H_{PET}$ single crystal=121 J/g.

$\Delta H_{sample}$ is the heat of fusion of the sample and $\Delta H_{PET\ single\ crystal}$ is the heat of fusion of the single crystal of PET. Note that the value of $\Delta H_{PET\ single\ crystal}$ as found by different investigators ranges between 118-155 J/g [see Z. Bashir et al., Polymer Engineering and Science, 40, 2442-2455 (2000)]. Here the value $\Delta H_{PET\ single\ crystal}$=121 J/g, was selected from F. J. Balta-Calleja et al., Polymer, 35, 4775 (1984).

In addition for the person skilled in the art, the DSC curve of PET shows other features which can distinguish a low or moderate crystallinity sample from a high crystallinity sample such as having at least 30%.

An amorphous or low crystallinity sample will shows a prominent Tg and a strong cold crystallisation exotherm (see FIG. 2) of various sizes. Highly crystalline particles having a heat of fusion of at least 40 J/g typically show no or a weakTg and/or a weak cold crystallisation exotherm.

The heat of fusion gives an indication of the crystallinity of the PEN particles according to the following equation:

$$\% \text{ crystallinity} = (\Delta H_{sample}/\Delta H_{PEN\ single\ crystal}) \times 100 \quad \text{Equation 1-2}$$

A value of 170 J/g may be used for $\Delta H_{PEN\ single\ crystal}$, as reported by Sauer et al. [Polymer, 41, 1099-1108 (2000)]

In the cases where the particles for use in the present invention have a certain size, i.e. the average particle size is at least 200 μm, the particles preferably have a density which indicates a high crystallinity. Preferred PET particles have a density of at least 1.38 g/cm³ and preferred PEN particles have a density of at least 1.34 g/cm³. The density of the shaped part can be measured in a density gradient column. The density is an indication of the crystallinity according to the following equation 2:

$$X_{CO} = \left(\frac{\rho_a}{\rho_{sample}}\right) \cdot \left(\frac{\rho_{sample} - \rho_a}{\rho_c - \rho_a}\right) \times 100$$

The most commonly used values for $\rho_c$ and $\rho_a$ are from R. de P. Daubeny, C. W. Bunn and C. J. Brown, Proceedings of the Royal Society, A 226, 531 (1954). From their X-ray crystal work, $\rho_c=1.455$ g/cm$^3$ for 100% crystalline PET analysis and $\rho_a=1.333$ g/cm$^3$ for the density of 100% amorphous PET. For PEN, $\rho_c=1.407$ g/cm$^3$ for 100% crystalline PEN and $\rho_a=1.327$ g/cm$^3$ for 100% amorphous PEN.

Accordingly, the PET particles preferably have a heat of fusion of at least 40 J/g. When the PET particles have an average particle size is at least 200 μm, the PET particles preferably have a heat of fusion of at least 40 J/g and a density of at least 1.38 g/cm$^3$. The PEN particles preferably have a heat of fusion of at least 40 J/g. When the PEN particles have an average particle size is at least 200 μm, the PEN particles preferably have a heat of fusion of at least 40 J/g and a density of at least 1.34 g/cm$^3$.

The PET powder for use in the present invention may be obtained by various methods.

One source for such highly crystalline PET powder is from a solid state polycondensation (SSP) plant. Most bottle grade PET resins are produced by a split process involving melt polycondensation followed by solid state polycondensation (SSP). Melt polycondensation uses a catalyst to promote the transesterification reaction, which is commonly antimony triacetate or trioxide.

The chips from melt polycondensation are amorphous and typically allowed to reach an I.V. of 0.63 dL/g. The chips are polymerised further through SSP; the process is 12-15 hours long. The output of solid state polycondensation is high I.V. chips (typically 0.84 dL/g) with a crystallinity of ~50% (density of 1.4020 g/cm$^3$).

The process of going from melt polymerised amorphous chips to SSP involves an intermediate crystallisation step. The amorphous chips have to be crystallised to avoid sticking in the SSP reactor. In a continuous plant, the amorphous chips would be pre-crystallised with heating and fluidisation, and with a rotary crystalliser (screw device).

Fine PET powder is generated at these plants due to inter-pellet abrasion. This PET powder is suitable for use in the process according to the invention. The PET powder from a SSP plant thus comes as a byproduct from the pre-crystalliser, rotary crystalliser, reactor and cooler de-duster. This material is treated as waste. From the pre-crystalliser and the SSP reactor cyclone, the waste is a mixture of PET pellets and powder, while from the cooler cyclone, the waste is only PET powder. The fine powder from the cooler cyclone reaches an I.V. higher than the SSP pellets (I.V. of ~1.00 dL/g and $\Delta H_{sample}=60$ J/g which may be translated to a crystallinity of ~50%) and this is a suitable raw material to practise the invention (FIG. 1).

Alternatively, the highly crystalline SSP pellets may be ground cryogenically to be turned into a powder, which may be used for the process of the present invention.

Yet other methods may be devised for making high I.V., high crystallinity fine PET powder, such as converting the polymer from melt polymerisation into a powdered form, and then conducting SSP with the powdered precursor.

Another method to make highly crystalline PET (with crystallinities of 85%) is solvent-swollen polymerisation, after which the swelling agent is removed.

Yet another method to make high I.V., highly crystalline PET powder is to conduct solution polymerisation and then precipitate the polymer in a non-solvent.

The PEN particles can also be obtained by various known methods.

Properties of the Shaped Part

A further aspect of the present invention provides a shaped part obtainable by the process according to the invention. The shaped part is highly crystalline obtainable by the process according to the invention.

The shaped part of PET preferably has a heat of fusion of at least 40 J/g (more preferably at least 45 J/g, at least 50 J/g or at least 55 J/g), as determined from the first heating curve of DSC at a heating rate of 10° C./minute and a density of at least 1.38 g/cm$^3$ (more preferably at least 1.39 g/cm$^3$ or at least 1.40 g/cm$^3$).

The shaped part of PEN preferably has a heat of fusion of at least 40 J/g (more preferably at least 45 J/g, at least 50 J/g or at least 55 J/g), as determined from the first heating curve of DSC at a heating rate of 10° C./minute and a density of at least 1.34 g/cm$^3$ (more preferably at least 1.35 g/cm$^3$ or at least 1.36 g/cm$^3$).

Such values of the heat of fusion and the density indicating high crystallinity of the shaped part cannot be reached in shaped parts made by conventional injection moulding of PET or PEN.

The density of the shaped part can be determined by cutting small slices from the shaped part with a knife and placing them in a density gradient column; the heat of fusion can be determined by using the cut slices in the DSC.

The DSC method when applied to the shaped part is directly related to the crystallinity and is unaffected by voids, hence it cannot provide a check on the degree of consolidation.

The high density of the shaped part indicates not only a high crystallinity but also a low void content. The high crystallinity results in a high heat resistance, high Vicat softening point, high hardness etc. and also the low void content results in good strength and impact properties). The teaching of KR20080043143 does not consider the need for low void content, as it does not indicate the density of the moulded spoon made from high crystallinity powder, nor its mechanical properties.

Preferably, the shaped part has Vicat softening points of at least 225° C.

Preferably, the shaped part has a high hardness, such as at least 70 in Rockwell M hardness test Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps. The invention will now be illustrated further with the experiments described below.

EXPERIMENTAL

The experiments were performed using the following types of PET powder and pellets.

PET Powder I

For comparative experiments 1-7, examples 1-7 and 16-17 and reference experiment 1, PET powder from a polyester plant was used, herein referred as PET powder I (cyclone powder).

The PET powder I was obtained from a polyester plant producing bottle grade chips. The powder was generated through inter-pellet abrasion mainly during the conversion of amorphous chips to crystalline chips. The PET powder I had 1.55% isophthalic acid comonomer and DEG of 1.2%, which is typical for a bottle grade. Due to its residence in the SSP reactor and due to its high surface area to volume, it reaches a much higher intrinsic viscosity (I.V.) than the pellets.

The PET powder I had an intrinsic viscosity of 1.00 dL/g (measured in 3:2 phenol:dichlorobenzene at 25° C.).

Its particle size distribution was established with laser light scattering (Malvern Mastersizer 2000). The peak of the distribution in the plot of volume (%) versus particle size was at 100 μm; the range was between 6-800 μm [d(0.1):40 μm; d(0.5): 116 μm; d(0.9): 358 μm].

Microscopy showed that the particles in the cyclone powder were not spherical but were elongated. Image analysis provided the approximate dimensions for the particles. It is to be expected that they would not be spherical, as this powder is generated through surfaces of chips peeling off due to abrasion.

Figure 1:
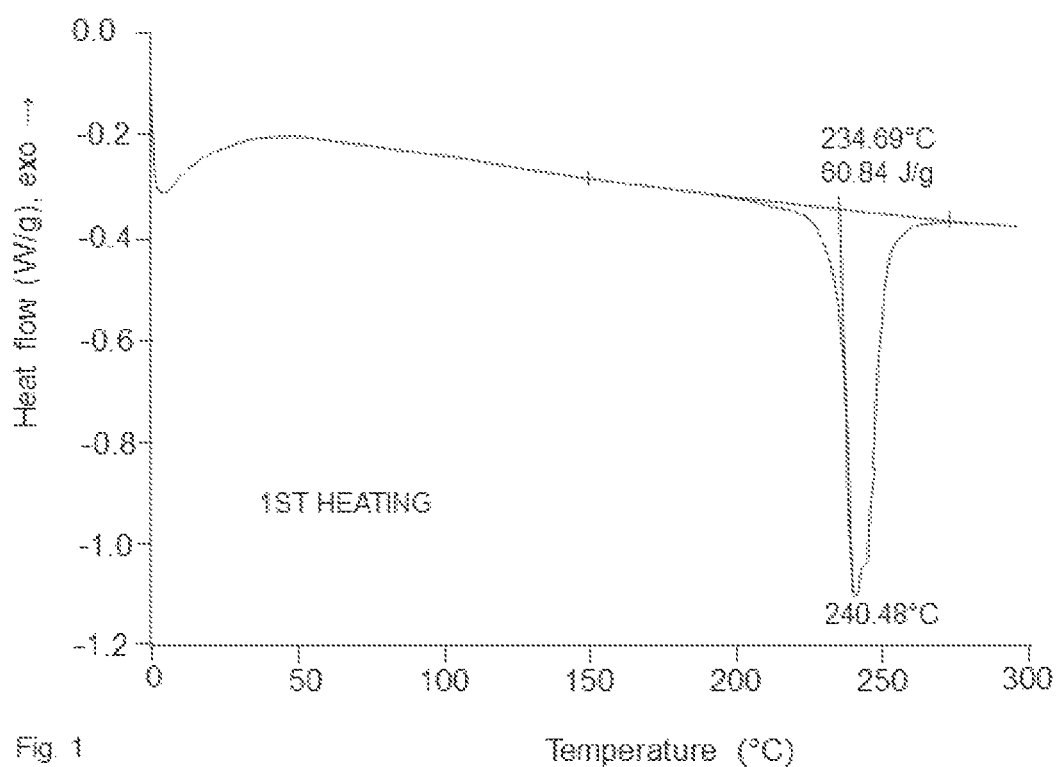
FIG. 1 shows the melting characteristic of one type of PET powder (highly crystalline) used in the process of the invention.

The melting characteristic of the PET powder was determined with the DSC (see FIG. 1). The powder was heated from 0 to 300° C. at 10° C./min. From the first heating curve, the $T_g$ was too weak to observe; this is normal with highly crystalline PET.

The heat of fusion was 60.84 J/g. The crystallinity calculated from equation 1-1 is 50.3%.

PET Powder II

For examples 8-11, PET powder obtained through cryogenic grinding of high crystallinity SSP chips was used. The PET pellets had an intrinsic viscosity of 0.84 dL/g, 1.55 wt % of isophthalic acid comonomer. The crystallinity indicated by the heat of fusion of the pellets was 50%.

The pellets were cooled in liquid nitrogen and then pulverized in a grinding mill. The resulting powder was coarse compared with the plant PET cyclone powder (PET powder I), having an average particle size of ~900 microns.

Its particle size distribution was established with laser light scattering (Malvern Mastersizer 2000). The distribution was bimodal, and the main peak in the plot of volume (%) versus particle size was at 900 μm; the range was between 55-2000 μm [d(0.1):340 μm; d(0.5): 860 μm; d(0.9): 1492 μm].

The crystallinity and the intrinsic viscosity of the PET powder II remain the same as the SSP chips from which it is derived: 50% and 0.84 dL/g, respectively.

PET Powder III

For example 12, amorphous PET powder with a lower I.V was used. Transparent amorphous pellets made by melt polycondensation (co-PET with 1.55% comonomer, I.V. of 0.63 dl/g) were ground after cooling under liquid nitrogen, to yield a coarse powder.

Figure 2:
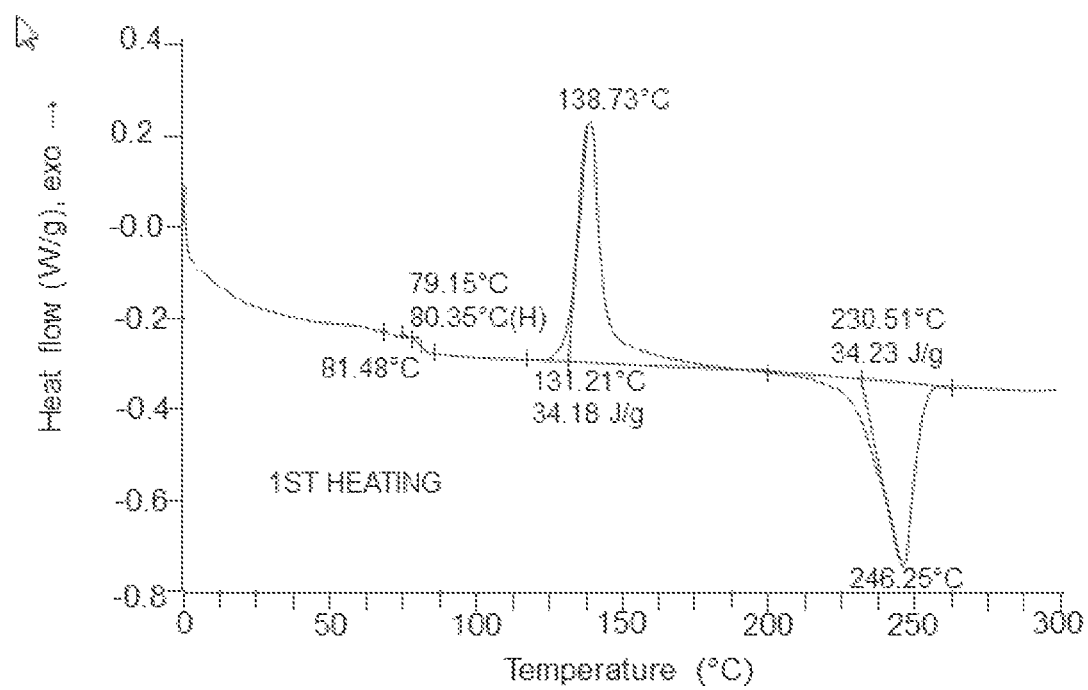
FIG. 2 shows the melting characteristic of a further type of PET powder (amorphous) used in the process of the invention.

An amorphous PET shows a curve such as the one in FIG. 2. There is a step like change in the heat capacity at the $T_g$, (~78° C.) followed by a cold-crystallisation exotherm at ~140° C. and a melting endotherm with peak at ~248° C. The heat of fusion is 34.23 J/g. Crystallinity cannot be accurately calculated.

The PET powder used had an intrinsic viscosity of 0.64 dL/g.

Its particle size distribution was similar to PET powder II.

PET Chips I

Figure 3:
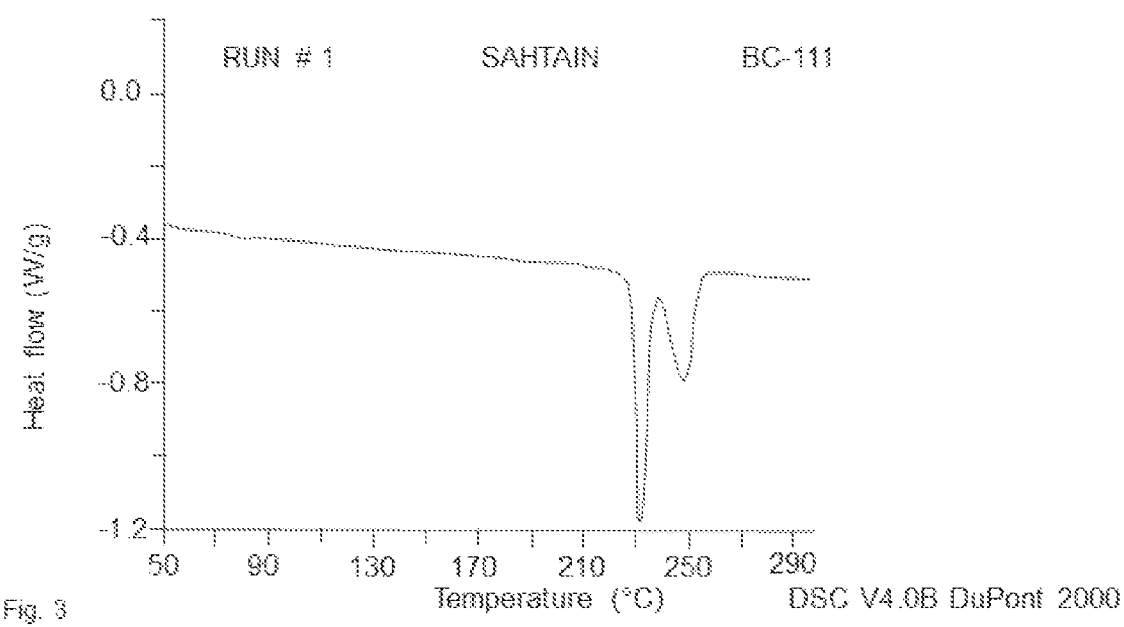
FIG. 3 shows the melting characteristic of one type of PET chip used in the process of the invention. It shows that highly crystalline PET can show double melting peaks, which arise due to overlapping melting-recrystallisation-melting.
Figure 4:
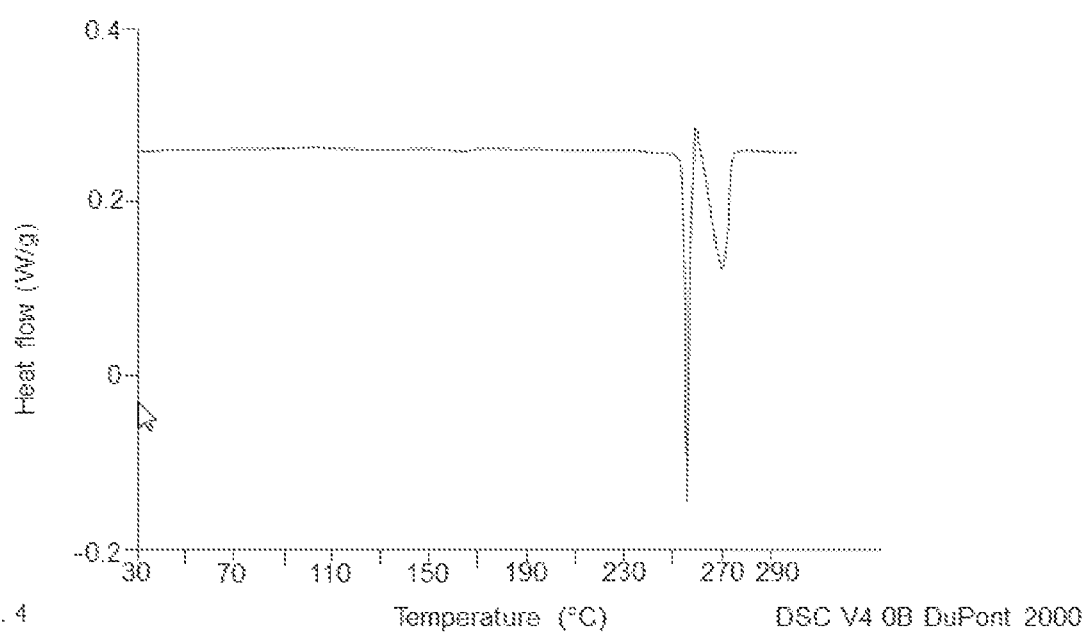
FIG. 4 shows the melting characteristic of one type of PEN powder used in the process of the invention. It shows the melting-recrystallisation-melting as distinct sequential events
Figure 5:
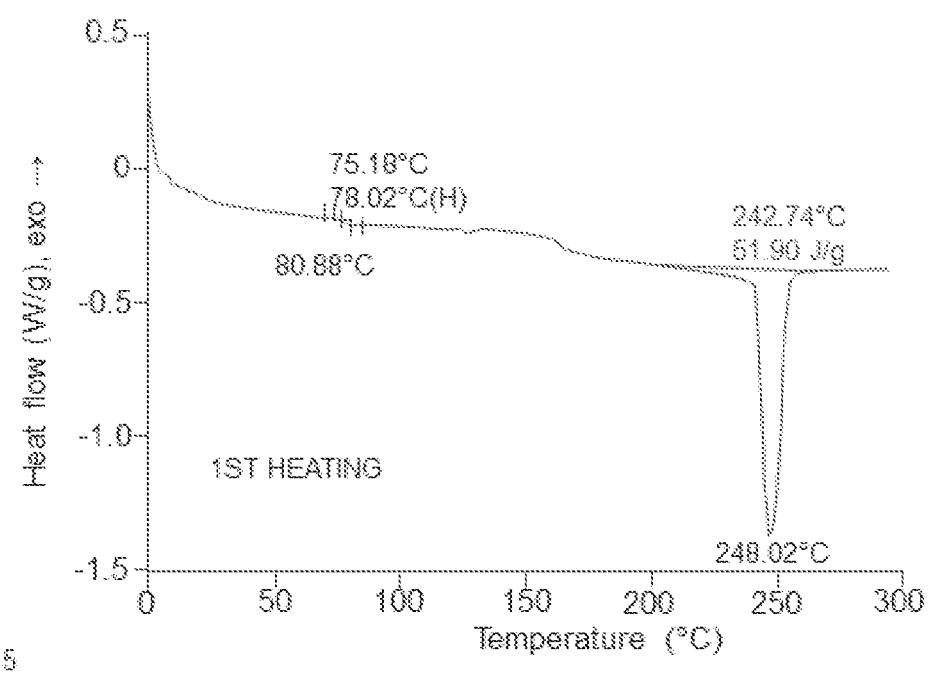
FIG. 5 shows the melting characteristic of a powder compacted cylinder.

For example 13-15, highly crystalline co-PET pellets (with 2% by wt. of IPA) from the SSP reactor were compacted directly (that is, without pulverisation). The I.V. of the chips was 0.84 dL/g, and the density was 1.400 g/cm³. The crystallinity indicated by the heat of fusion of the pellets was 50%. The DSC curve is shown in FIG. 3.

PET Chips II

These were solid-state polymerised very high I.V. homoPET chips (I.V.=1,0 dL/g, comonomer=0%, DEG of 1.0 wt %, crystallinity by DSC of 50%, peak melting peak of 258° C. in the DSC), It was used in example 16, to form a PET-PET composite of PET powder I and PET chips II.

PET Chips III

For example 17, highly crystalline co-PET pellets (I.V. of 0.78 dL/g, DEG of 1.3% comonomer=2% by wt. of IPA) from the SSP reactor were used form a PET-PET composite of PET powder I and PET chips III.

COMPARATIVE EXPERIMENT 1

Rheometer, PET Powder I

A Ceast capillary rheometer with a barrel diameter of 1.4 cm was used. An insert without a capillary was placed at the bottom of the barrel. The corresponding piston and the barrel were made of steel. The rheometer, although designed primarily for rheological measurements on polymer melts, is similar to a single-sided punch-and-die tool for making cylindrical specimens in powder metallurgy, but with the facility to heat the barrel. The barrel of the rheometer is the die (the cavity) and the piston is the punch.

The PET powder I (undried) was placed in the barrel set at a temperature of 260° C. The piston was driven down to apply a pressure of 10 MPa for 5 minutes. The pressure was released, the insert at the bottom was removed, and the piston was driven down.

What emerged was a transparent, molten blob, which fell on a gathering plate placed below to gather the extrudate. The melted extrudate formed filaments (due to extensional flow caused by gravity). The solidified mass with filaments has a transparent skin, and milky interior. This is the conventional result of melt extrusion of PET. Thus, 260° C. is beyond the upper compaction limit for PET.

COMPARATIVE EXPERIMENT 2

Rheometer, PET Powder I

A punch and die assembly used in powder metallurgy was used for cold compaction of PET powder I.

The PET powder I was placed in the die at room temperature. The punch was driven down to apply a pressure of 70 MPa for 10 minutes. Cylindrical green-compacts (1.5 cm tall, 2.2 cm diameter; 7.36 g weight, density 1.291 g/cm$^3$) were obtained. The aspect ratio of the cylindrical part was 1.5:2.2=0.68:1. As the density of the crystalline powder was similar to the SSP pellets from which it was derived (about 1.4 g/cm$^3$), this means the green compact had attained about 92% of the theoretical density.

The compacts retained their cylindrical shape and were coherent enough to be handled manually (it was like chalk). But the powder on the surface of the compact could be felt by hand and could be rubbed off. Thus cold compaction does not lead to sufficient mechanical integrity.

In this experiment, it can be seen that highly crystalline powder consisting of individual particles having a high density leads to a density of only 1.291 g/cm$^3$ when turned into a green compact by cold pressing. The crystals were not melted as the pressing was done at room temperature in Comparative Example 2, hence the lowered density (in fact lower than the density of amorphous PET, which is 1.333 g/cm$^3$) indicates the green compact is porous.

COMPARATIVE EXPERIMENT 3

Rheometer, PET Powder I

The green compacts of PET made in the comparative experiment 2 were placed in an oven at various temperatures (230-255° C., from 15 to 30 minutes), in order to consolidate and densify them, as is the practice in powder metallurgy. Both fan and vacuum oven were tried. However, no conditions of temperature and time could be found where the compact made at room temperature would densify and retain its shape. When the temperature was 240° C., sufficient densification did not take place and the compact became brown and brittle due to degradation if the time was prolonged beyond 20 minutes. In fact, the compact cracked into two pieces at the cross section at the middle. When a higher temperature like 255° C. was used, the top of the cylindrical compact melted and flowed down like a candle, so the shape was lost. The conclusion is that the process used in powder metallurgy (cold compaction to make a 'green' compact followed by pressureless sintering) cannot be copied exactly for PET and PEN powders.

COMPARATIVE EXPERIMENT 4

Rheometer, PET Powder I

The capillary rheometer and the PET powder used for comparative example 1 were used for comparative experiment 4.

The PET powder I was placed in the barrel set at a temperature of 225° C. The piston was driven down to apply a pressure of 50 MPa for 15 minutes. The pressure was released, the insert at the bottom was removed, and the piston was driven down at a temperature of 225° C., to discharge the part.

The compact was pushed out in the form of a cylinder at 225° C.; there was no gross shrinkage or warping. One could now feel the surface was slightly rough by rubbing with the hand. The cylinder was cut with a bandsaw; powder particle boundaries could be seen and this was also confirmed by microscopy. The cylinder could also be broken more easily by hand, and the cross section showed a jagged surface from the powder particle boundaries. The compact broke with cracks running around the particle boundaries; the broken cross section had the texture of a broken chalk stick. Thus, this example shows that going below 230° C. leads to only partial consolidation.

COMPARATIVE EXPERIMENT 5

Rheometer, PET Powder I 15 g of the PET powder I was placed in the barrel set at a temperature of 250° C., and a very low pressure of 0.2 MPa was applied for 10 minutes. The pressure was released, the insert at the bottom was removed, and the piston was driven down at a temperature of 250° C. to discharge the billet.

The compact was pushed out in the form of a cylinder; there was no gross shrinkage or warping. The surface of the billet was smooth. However, when sawing the cylinder manually with a hacksaw, when half way across the diameter, the remainder snapped off in a brittle manner. The portion of the cylinder cross section that was sawn had the tooth marks of the saw but the area that snapped off appeared smooth and shiny—this is generally a sign of brittle failure. The cause is the presence of a few micro voids (sub-mm size). Thus, apparent consolidation occurs at 250° C. even at pressures as low as 0.2 MPa, but the material fails in a brittle manner due to microvoids, which is undesirable.

The DSC curve showed that the compacted article made at 250° C. with 0.2 MPa compaction pressure had no detectable Tg, and there was no cold-crystallisation; there was a low melting tail starting at about 175° C. with a very small broad peak, followed by a sharp peak at 259.2° C. The heat of fusion was 61.3 J/g. Thus, in terms of crystallinity, the sample is excellent, but due to the microvoids, and the extended low melting tail, such a low pressure is not suitable for making a shaped article.

COMPARATIVE EXPERIMENT 6

Rheometer, PET Powder I

Comparative Example 5 was repeated except that a pressure of 1 MPa was applied for 10 minutes. The pressure was released, the insert at the bottom was removed, and the piston was driven down at a temperature of 250° C. to discharge the billet.

The DSC curve showed that the compacted article made at 250° C. with 1 MPa compaction pressure had no detectable Tg, and there was no cold-crystallisation; there was a low melting tail starting at about 190° C. with a very small broad peak, followed by a sharp peak at 259.5° C. The heat of fusion was 61.5 J/g.

The surface of the billet was smooth and glossy. However, after cutting the cross section with a hack saw, a few sub mm voids were perceptible by eye. Hence, such a low pressure is not suitable for making a shaped article. The disadvantages are especially large for compaction of thick cross sections and samples with high aspect ratio, as they will be susceptible to lowered strengths and brittle fracture if voids are present.

COMPARATIVE EXPERIMENT 7

Rheometer, PET Powder I

Comparative Example 5 was repeated except that a pressure of 2 MPa was applied for 4 minutes. The pressure was released, the insert at the bottom was removed, and the piston was driven down at a temperature of 250° C. to discharge the billet.

The compact was pushed out in the form of a cylinder at 250° C.; there was no gross shrinkage or warping. The surface of the billet was smooth. The billet was clamped in a vise and sawn with a hack saw. After sawing half way across the diameter, the remainder snapped off in a brittle manner. The portion that was sawn had the tooth marks of the saw but the area that snapped off appeared smooth and shiny—this is generally, a sign of brittle failure.

Thus, at low pressures at or below 2 MPa, although a good finish was obtained at a higher compaction temperature such as 250° C., and the powder grains had fused together when they were in contact, still the material failed in a brittle manner due to micro voids which were sub mm, and which could be seen by eye. The microvoids arose because the low pressure led to under-compaction.

EXAMPLE 1

Rheometer, PET Powder I

Comparative experiment 4 was repeated except that the compacting temperature was 230° C. and the part-removal temperature was 230° C.

The compact was pushed out in the form of a cylinder; there was no gross shrinkage or warping. The cylinder surface was not rough or powdery. The cylinder (about 7 cm long) was cut into half with a bandsaw; powder particle boundaries could not be seen, and only the saw marks were visible. The sample did not snap into two after sawing half way through.

EXAMPLE 2

Rheometer, PET Powder I

Comparative experiment 4 was repeated except that the compacting temperature was 235° C. and the part removal temperature was 235° C.

The compact had a good smooth finish, and was pushed out cleanly; there was no gross shrinkage or warping, and the article was a perfect white cylinder. One could not feel any powder particles by rubbing with the hand. The cylinder was cut with a bandsaw; no powder particles could be seen and this was also confirmed by microscopy. The cylinder was very hard and rigid. Throwing the cylinder on the floor with great force and bouncing it off the wall did not lead to chipping or brittle fracture. The I.V. of the compact was 0.785 dL/g. The I.V. is high enough to give good mechanical properties. However, the I.V. drop is high (from 1 dL/g to 0.785 dL/g). The high I.V. drop could have been reduced by drying the powder.

Density of the shaped part was measured by cutting small slices with a knife and placing them in a density gradient column. The density of the part was 1.3988 g/cm$^3$ (3 tests, Standard Deviation=0.0005). Such a density is a high for an unoriented manufactured PET article, and is only achieved in highly oriented and heat set PET fibres for example.

The DSC curve of the billet showed a weak $T_g$, no cold crystallization peak, and a melting peak at 246° C. with no low-melting tail, and a melting peak with heat of fusion of 51.8 J/g. This indicates that the process of the invention does not melt the PET powder particle entirely, hence the finished article retains the high crystallinity of the original powder. At this temperature, only the surface of the powder particles melt, and this binds the particles together; on cooling, even the melted particle surface crystallises as the interior of the powder acts as a nucleating agent. When the compacted cylinder was placed in an oven at 235° C. for 1 hour, it did not lose it shape (in contrast with Comparative Example 3).

Thus both the density and the DSC of the part indicate retention of much of the high crystallinity of the powder.

EXAMPLE 3

Rheometer, PET Powder I

Comparative experiment 4 was repeated except that the compacting temperature was 240° C. and the removal temperature was 240° C.

The compact had a good smooth finish; there was no gross shrinkage or warping, and the article was a perfect white cylinder. The cylinder was cut into half, by sawing parallel to the diameter with a bandsaw; no powder particles could be seen and this was also confirmed by microscopy. The cylinder halves were very hard and rigid. Throwing the cylinder on the floor with great force and bouncing it off the wall did not lead to chipping or brittle fracture. The I.V. of the compact was 0.7 dL/g.

The density of the compact was 1.4001 g/cm$^3$ (STD=0.0014). The DSC curve of the billet showed a weak $T_g$, at 78° C., a very weak and broad cold crystallization peak, and a melting peak at 248° C. with low-melting tail between 210-235° C., and a melting peak with a heat of fusion of 51.9 J/g. While the density indicated a high crystallinity compact, the DSC indicated that while the compact overall had high crystallinity, a portion had melted and not re-crystallised to a high degree (this led to the weak Tg, and the weak cold crystalisation).

EXAMPLE 4

Rheometer, PET Powder I

Comparative experiment 4 was repeated except that the compacting temperature was 245° C., the removal temperature was 245° C. and the amount of the powder was chosen to obtain a 3 cm long billet (aspect ratio of about 2:1);

The discharged billet did not break when dropped at 245° C. and on cutting, the cross section showed good consolidation.

EXAMPLE 5

Rheometer, PET Powder I

Comparative experiment 4 was repeated except that the compacting temperature was 250° C. and the part removal temperature was 250° C.

A 7 cm long billet (high aspect ratio part) was made. The cylinder was cut with a bandsaw; no powder particles could be seen and this was also confirmed by microscopy. The cylinder was very hard and rigid. Throwing the cylinder on the floor with great force and bouncing it off the wall did not lead to chipping or brittle fracture. The I.V. of the compact was 0.7 dL/g.

The density was 1.4103 g/cm$^3$ (STD=0.0006). The DSC curve showed a weak $T_g$ at 74° C., and there was no cold crystallization observable. The melting showed two overlapping peaks, consisting of a broad weak peak between 200-250° C. with peak at 246° C., followed by a narrow peak at 257° C.; the combined area of the two peaks gave a heat of fusion of 50.8 J/g.

Example 5 should also be compared with Comparative Example 6 in which compaction was done also at 250° C. but at a low pressure of 1 MPa. Although a higher heat of fusion (that is higher crystallinity) was obtained at the lower pressure of 1 MPa and the finish was good, the existence of microvoids (sub mm voids) reduced the strength and made the article susceptible to brittle fracture.

EXAMPLE 6

Rheometer, PET Powder I

Comparative experiment 4 was repeated except that the compacting temperature was 255° C. and the removal temperature was 255° C.

The billet had acceptable mechanical properties, but the billet had a poor finish; while the surface showed a smoother, glossy appearance in parts, there were also many axial pit marks on the cylinder surface. At this temperature, when the billet was pushed out, the material responded partially like a melt under shear flow, sticking to the barrel wall and debonding; this led to the surface damage in the part.

The density however was 1.4034 g/cm$^3$ which shows the material had not melted to such an extent that a high crystallinity could not be retained. Thus, at this temperature the voids are reduced and the crystallinity is not lost. However, the only problem is that the billet cannot be discharged at the compaction temperature without surface damage, as it is a semi-melt.

EXAMPLE 7

Rheometer, PET Powder I

Example 6 was repeated except that after the 15 minutes of compaction time at 255° C., the barrel was allowed to cool to 225° C., before the insert was removed and the piston driven down to push the billet out.

The billet now had a smooth white surface and cutting the cross section showed no powder grains. The density was 1.3921 g/cm$^3$ (STD=0.0004). The DSC curve showed a weak $T_g$ at 74° C., no cold crystallization; the melting endotherm showed two overlapping peaks, a narrow small peak at 229° C. and a major peak at 252° C.; the total area under both peaks gave a heat of fusion 59.5 J/g.

Table 1 shows the intrinsic viscosity and the density of the billets obtained. The parts retain densities and hence crystallinities similar to the high crystallinity SSP powder. Such high densities would not be obtained if the powder I had been converted to a transparent melt and then cooled.

TABLE 1

The density is the average of three measurements; STD is the standard deviation.

| Example | Compaction temperature | I.V. (dL/g) | Density of compacted PET part (g/cm$^3$) | % Crystallinity from equation 2 |
|---|---|---|---|---|
| 1 | 230° C. | not measured | not measured | |
| 2 | 235° C. | 0.785 dL/g | 1.3988 (STD = 0.0005) | 56.1 |
| 3 | 240° C. | 0.7 dL/g | 1.4001 (STD = 0.0014) | 57.2 |
| 4 | 245° C. | not measured | 1.4017 (STD = 0.0002) | 58.5 |
| 5 | 250° C. | 0.7 dL/g | 1.4103 (STD = 0.0006) | 65.4 |
| 6 | 255° C. | 0.785 dL/g | 1.4034 | 59.8 |
| 7 | 255° C., cooled to 225° C. and then discharged | not measured | 1.3921 (STD = 0.0004) | 50.6 |

Normally polyesters like PET and PEN have to be dried to less than 50 ppm of moisture before using it in any melt extrusion process; otherwise the I.V. drops with a concomitant decrease in mechanical properties. Here, it was thought that as the compaction temperature was 230-255° C., and the starting I.V. of the co-PET powder was very high (1.00 dL/g), it would be possible to work without drying. It was found that using the powder without drying led to a drop in I.V. to about 0.78 dL/g in moulded billets; but even at this reduced I.V., the article still had excellent properties. It would not be possible to use undried PET for a melt extrusion process as the I.V. drop increases with temperature, but with the current process, as the compaction temperature is lower, it is possible to work with undried PET. However, in general one can anticipate better mechanical properties with higher I.V. If the PET powder had been dried, the expected I.V. drop would be about 0.03 dL/g, that is the part would have an I.V. of about 0.97 dL/g.

The polymer powder is hence preferably dried to less than 50 ppm of moisture before moulding. Further, it is preferable to have a dry nitrogen atmosphere in the compaction zone. In this case, it should be possible to make moulded articles with I.V.s above 0.95 dL/g, starting with I.V. of 1.0 dL/g; this precaution would enhance the properties of the mouldings.

EXAMPLE 8

Rheometer, PET Powder II

Example 1 was repeated (compact temperature and removal temperature of 230° C.), except that PET powder II was used.

When the billet was cut with a band saw, the powder grains could not be seen. The density of the billet was 1.3888 g/cm$^3$ (STD=0.0005). The DSC curve showed a weak $T_g$ at 77° C., no cold crystallization peak, and double melting endothermic peaks of roughly the same size at 237° C. and 250° C.; the combined area was 54.7 J/g.

EXAMPLE 9

Rheometer, PET Powder II

Example 8 was repeated except that the compact temperature was 235° C. and the compact removal temperature was 235° C.

Again, when the billet was cut with a band saw, the powder grains could not be seen. The density of the billet was 1.3924 g/cm$^3$ (STD=0.0003). The DSC curve showed a weak $T_g$ at 75° C., a faint cold crystallization peak, and a single melting endothermic peak at 245° C. with 46 J/g.

EXAMPLE 10

Rheometer, PET Powder II

Example 8 was repeated except that the compaction temperature was 240° C. and the compact removal temperature was 240° C. Again, when the billet was cut with a band saw, the powder grains could not be seen. The DSC curve showed a weak $T_g$ at 76° C., no cold crystallization peak, and a single melting endothermic peak at 247° C. with 44 J/g.

EXAMPLE 11

Rheometer, PET Powder II

Example 8 was repeated except that the compact temperature was 245° C. and the compact removal temperature was 245° C.

Again, when the billet was cut with a band saw, the powder grains could not be seen. The density of the billet was 1.3851 g/cm$^3$ (average of 3 readings, standard deviation=0.0007). The $T_g$ was not seen in the DSC curve; but there was a cold crystallisation peak, and a single melting endothermic peak at 251.6° C. with a heat of fusion of 50.6 J/g.

EXAMPLE 12

Rheometer, PET Powder III

Example 1 was repeated using the transparent amorphous PET powder III.

The powder was compacted at 225° C., 230° C., 235° C. and 240° C. (four separate experiments) in the rheometer.

All the billets became white due to crystallization during compaction. The best surface finish was obtained at the compaction temperature of 230° C. The surface finish was less good at other temperatures.

This shows that the amorphous PET powder has a less tendency to form a desired shaped part.

The DSC curve of the best billet made from the amorphous powder (at 230° C.) was also recorded. This showed a weak $T_g$ at 74° C., no cold crystallization exotherm and a double-peaked melting endotherm with peaks at 244° C. and 252° C., with a heat of fusion of 47.3 J/g.

EXAMPLE 13

Rheometer, PET Pellets I

In this experiment, highly crystalline PET (2% IPA co-PET) pellets were compacted directly, without pulverising the chips. The pellets were slightly elliptical in cross section, with a length of about 3 mm and longest dimension of the cross section (major axis of the ellipse) was also 3 mm. 10 g of the pellets were compressed at 250° C. for 5 minutes under a very high pressure of 180 MPa. A billet was indeed formed, and it could be discharged at the compaction temperature of 250° C. The billet was sawn with a hack saw perpendicular to its long axis. The cross section showed good consolidation, but had a skin-core appearance—an outer ring appeared to have melted more and appeared uniformly white, while the core in the cross-section showed pellet outlines, like raisins lodged in a cake. However, the pellets were bonded well to the matrix, as the saw cut through the matrix and pellet without dislodging the pellets.

EXAMPLE 14

Rheometer, PET Pellets I

After Example 13, it was thought that a lower temperature would reduce the excessive melting of the pellets. In this experiment, the PET pellets I were compacted directly, without pulverising the chips. 10 g of the PET pellets I were compressed at 245° C. for 5 minutes under a very high pressure of 180 MPa. A billet was indeed formed, and it could be discharged at the compaction temperature of 245° C. Although the billet was successfully made, the pellets were less consolidated than in Example 13. When the billet was sawn with a hack saw perpendicular to its long axis, the cross section showed a jagged profile with pellets sticking out, as they were not bonded well enough. It was thought that the optimum temperature for pellet compaction would lie between 245° C. and 250° C.

EXAMPLE 15

Rheometer, PET Pellets I

The highly crystalline PET (2% IPA co-PET) pellets of the previous example were compacted directly, without pulverising the chips. 10 g of the pellets were compressed at 248° C. for 5 minutes under a very high pressure of 180 MPa. A billet was indeed formed, and it could be discharged at the compaction temperature of 248° C. At this temperature, the best consolidation was achieved. The billet's cylindrical surface was smooth although the pellet outline could be seen in the curved surface (a brick and mortar appearance). When the billet was sawn with a hack saw perpendicular to its long axis, the cross section showed no skin core effect as in Example 13, but a brick and mortar outline of pellets and matrix could be seen (matrix consists of PET melted from the pellet surface but recrystallised). However, the sawn surface was not jagged, as the saw cut through matrix and pellets without de-bonding the pellets.

Examples 13-15 thus show that even highly crystalline PET pellets can be compacted to form a highly crystalline PET article. The advantage of using PET pellets directly for compaction is that highly crystalline PET pellets are commercially available in a large scale. In contrast, by using fine PET powder, the optimal compaction temperature window is widened and the pressure needed is reduced. Highly crystalline PET powder is the most preferred raw material for the process.

EXAMPLE 16

Rheometer, PET Powder I+PET Chips II

In this example, the PET powder I was mixed with PET pellets II and then moulded. The powder: pellet ratio was 50:50 by weight. The PET homopellets were first dry-blended with the high crystallinity fine co-PET powder I. After this, the powder-pellet mixture was charged into the barrel of the capillary rheometer. The sample was then compressed under a pressure of 50 MPa at 255° C. for 15 minutes, and afterwards the billet was cooled to 250° C. and extracted. The co-PET powder had softened and the surface of the homoPET pellets had also melted sufficiently to bond with the coPET matrix. The cut cross section of the billet was not jagged although the pellet boundaries could be seen; but the saw cut through the matrix and the pellets, as if it was one.

EXAMPLE 17

Rheometer, PET Powder I+coPET Chips III

In this example, the PET powder I was mixed with PET pellets III and then moulded. The higher comonomer content and lower I.V. would depress the melting point of the chips. The co-PET chips IV also had an interesting double peak melting endotherm in the DSC (as in FIG. 3). This arises due to overlapping melting-recrystallisation-melting phenomena. The co-PET pellets were first dry-blended with the PET powder in the weight ratio of 50:50, to distribute the pellets uniformly in the powder. After this, the powder-pellet mixture was charged into the barrel of the capillary rheometer. The sample was then compressed under a pressure of 50 MPa at 253° C. for 15 minutes, and afterwards the billet was extracted. The cylindrical billet was smooth. The cylinder was cut into two pieces with a band saw and the cross section was examined. The powder particle grains could not be seen. The outline of some of the pellets could be seen, but they were not debonded, or pulled out when the hack saw cut across the billet. In fact, the hack saw cut through the matrix and pellet.

REFERENCE EXPERIMENT 1

Not Punch/Die Type, PET Powder I

In this experiment, an ASTM D638 tensile dumb bell bar and an Izod test bar were made by compacting the PET powder I at 253° C. A punch and die type of tooling to make such a shape was not available. This would require for instance a male member with the shape of the dumb bell (the punch) and a corresponding cavity (the die).

The compacting tool consisted of two outer steel plates and a steel plate with a cavity having the shape of the article (the mould), in which the powder is to be filled. This assembly is conventionally used for compression moulding of thermoplastics (where the polymer is melted and cooled) and is different from a punch and die type of tooling.

The steel plate with the cavity was placed on a first outer plate, which had been sprayed with a mould release agent. The cavity was overfilled with the powder. The second outer plate was placed on top and the assembly was compressed in a heated press and was compacted at 253° C., under a pressure of 15 MPa.

The dimensions of the ASTM tensile bar were 7 cm gauge length, 1.2 cm wide, and 6 mm thickness; the Izod bar was 6.3 cm long, 1.2 cm wide and 6 mm hick.

The obtained shaped parts were stiff and could be detached from the mould, although with difficulty. The articles had the occasional macro void (3-5 mm). The void is believed to have arisen from air trapped in the powder. The powder at the surface (in contact with the heated mould plates) consolidates first and seals the surface, and the entrapped air in the powder at the core of the moulding cannot escape.

The tensile bar was used for the tensile modulus measurement. The tensile modulus measured with an Instron tensile testing machine was 3.85 GPa. The tensile strength was also measured, but the bar broke at the macrovoid and the true strength could not be measured. Even the presence of one macrovoid is sufficient to make the sample unusable for measuring the tensile strength (the cross section after breakage shows the macrovoid). Thus, the tensile bar could give the modulus (a low strain property) but not the true tensile strength due to premature breakage initiated by the void.

The Izod bar also could not be used for impact measurements due to entrapped macrovoids; again a single large void makes the specimen break at that point. However the powder compaction with the compression moulding tools proves that it is possible to make shapes other than a simple cylinder by compacting high crystallinity polyester powder, to obtain high crystallinity articles with high hardness and a good tensile modulus. It is only a matter of designing a heated punch and die type of tooling with the appropriate shape, and taking steps to remove trapped air.

Although the Izod impact bars were not suitable for measuring the impact strength (due to the macrovoid), the piece was used for Vicat A softening point measurements and Rockwell hardness measurements, where only the surface of the bar comes into play during the test. The measurements were performed as follows.

Vicat A Test for Softening Temperature (Using Specimen from Reference Exp. 1)

The 6 mm thick Izod bar made from the powdered PET had the correct dimensions for the Vicat A test. In the Vicat A test, a 1 kg. load (10 N) is applied to a pin in contact with the moulded bar, while the sample was heated at 50° C./h by immersing in a hot oil bath. The maximum temperature available with the oil bath was 200° C. The softening point is taken as the temperature at which the pin penetrates 1 mm under the constant load of 1 kg. Injection moulded samples of other polymers like PE, PP, polycarbonate, polystyrene and amorphous PET were also used for comparison of softening points. This comparison reveals the extraordinary properties of the high crystallinity article made from high crystallinity PET powder.

TABLE 2

Vicat A softening temperature.

| Polymer | Vicat A softening temperature (° C.) | Comments |
|---|---|---|
| HDPE | 128 | Injection moulded |
| Polypropylene | 155 | " |
| Polycarbonate | 138 | " |
| Polystyrene | 92 | " |

TABLE 2-continued

Vicat A softening temperature.

| Polymer | Vicat A softening temperature (° C.) | Comments |
|---|---|---|
| High impact polystyrene | 99 | " |
| Amorphous injection moulded PET | 85 | Literature |
| PET, conventional crystallinity, density 1.37 | 170 | Literature |
| 1.55% IPA-PET copolymer, compacted from high crystallinity powder | >200 | 200° C. was the limit of the oil bath available. At 200° C., the pin penetrated less than 0.1 mm. Actual estimated to be 225° C. |
| PET, 25-45%, glass fibre filled | 225 | Literature |

Rockwell Hardness Test

It was noticeable that the shaped parts such as the ASTM dumb bell and the Izod bar were very hard; this could be realised by scratching with a nail. To quantify this, the Rockwell hardness was measured.

The hardness of a material can be described as the resistance it offers against indentation by another, harder body. The indenter can be a stylus (cone or truncated cone) or a steel ball. After a given period—under constant load when testing soft and elastic plastics—the depth of indentation into the test part is measured and the hardness calculated accordingly.

A macro level characterisation is the Rockwell hardness test. While some hardness tests measure both the elastic and permanent (plastic) deformation, the Rockwell test G29 considers only the plastic portion. The test piece is contacted by a steel ball (the indenter), with a preliminary minor load; then an additional test load (major load) is applied for 15 seconds. The major load is then removed but the minor load remains in place on the ball; the indentation depth is then measured after 15 seconds. There are different scales, so the test can cover plastics with a broader hardness range. The most widely used is the M scale for thermoplastics (ball diameter 6.35 mm, test load 980N).

Rockwell hardness (M scale) was measured for the high crystallinity PET article (powder moulded Izod bar, Reference experiment 1). For comparison, the hardness of other polymers was also measured. The following injection moulded plaques (10.3 cm×5.2 cm, 3 mm thickness) were used for the comparative examples: (1) PE (2) PP (3) polycarbonate (4) polystyrene and (5) transparent amorphous PET. Of these, the PE and PP are semi-crystalline with crystallinities greater than the powder compacted PET, while the injection mouded plaques of (3), (4) and (5) were amorphous. The results are shown in Table 3. The measurements indicate the compacted bar made from highly crystalline PET powder has high hardness and it is only exceeded by the glass fibre filled PET grade.

TABLE 3

Rockwell hardness (M scale)

| Polymer | Rockwell hardness, M | Process |
|---|---|---|
| HD polyethylene | 32 | Injection moulded |
| Polycarbonate | 33.3 | Injection moulded |
| Polystyrene | 53 | Injection moulded |
| High impact polystyrene | 71 | Injection moulded |
| Amorphous PET | 68.7 | Injection moulded |
| Crystalline PET article of the invention | 78 | hot compacted from high crystallinity powder |
| PET, 30% glass fibre filled, Du Pont Rynite | 90-100 | Literature value, injection moulded |

The invention claimed is:

1. A process for making a shaped part from a polymer selected from polyethylene terephthalate (PET) and polyethylene naphthalate (PEN) by using a compacting tool comprising a die having a cavity and a punch having an outer surface corresponding to the cavity, wherein the process comprises the steps of:
   a) placing particles of the polymer in the cavity of the die which has been heated to a compaction temperature, wherein the polymer has an intrinsic viscosity of at least 0.45 dL/g wherein the particles are a mixture of first particles with a particle size of 0.5-200 μm and second particles with a particle size of 1000-4000 μm,
   b) pressing the particles in the heated die cavity at a pressure of at least 3 MPa for 5-15 minutes while maintaining the temperature of the die at the compaction temperature to form the shaped part and
   c) removing the shaped part from the die cavity,
   wherein when the polymer is PET, the compaction temperature is 235-259° C. and
   wherein when the polymer is PEN, the compaction temperature is 250-275° C.

2. The process according to claim 1, wherein the polymer is a PET homopolymer or a PEN homopolymer.

3. The process according to claim 1, wherein the polymer of step a) has moisture level of less than 50 ppm.

4. The process according to claim 1, wherein the process further comprises the step of applying a vacuum of less than 10 kPa to the cavity of the die between steps a) and b).

5. The process according to claim 1, wherein step b) is performed in a dry nitrogen atmosphere.

6. The process according to claim 1, wherein the particles to be placed in the die cavity in step a) is pre-heated to a temperature 100-50° C. below the compaction temperature.

7. The process according to claim 1, wherein the particles have a heat of fusion of at least 40 J/g as determined from the first heating curve of DSC at a heating rate of 10 ° C/minute.

8. The process according to claim 1, wherein the cavity of the die and the corresponding outer surface of the punch have a brass surface.

9. The process according to claim 1, wherein step c) is performed at the compaction temperature.

10. The process according to claim 1, wherein step c) is performed at a temperature below the compaction temperature.

11. The process according to claim 10, wherein step c) is performed at a temperature at least 1° C. lower than the compaction temperature.

12. The process according to claim 11, wherein step c) is performed at a temperature at least 10° C. lower than the compaction temperature.

13. The process according to claim 9, further comprising the step d) of refilling the die and repeating steps a)-c).

* * * * *